(12) United States Patent
Shoji

(10) Patent No.: US 11,325,469 B2
(45) Date of Patent: May 10, 2022

(54) IN-VEHICLE INFORMATION APPARATUS

(71) Applicant: Mitsubishi Electric Corporation, Tokyo (JP)

(72) Inventor: Masakazu Shoji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 379 days.

(21) Appl. No.: 16/620,804

(22) PCT Filed: Jul. 25, 2017

(86) PCT No.: PCT/JP2017/026846
§ 371 (c)(1),
(2) Date: Dec. 9, 2019

(87) PCT Pub. No.: WO2019/021368
PCT Pub. Date: Jan. 31, 2019

(65) Prior Publication Data
US 2021/0138901 A1    May 13, 2021

(51) Int. Cl.
*B60K 35/00* (2006.01)
*G06F 3/16* (2006.01)
*G11B 33/12* (2006.01)

(52) U.S. Cl.
CPC .............. *B60K 35/00* (2013.01); *G06F 3/162* (2013.01); *G11B 33/122* (2013.01); *B60K 2370/157* (2019.05); *B60K 2370/42* (2019.05); *B60K 2370/46* (2019.05)

(58) Field of Classification Search
CPC .............. B60K 35/00; B60K 2370/157; B60K 2370/42; B60K 2370/46; G06F 3/162; G11B 33/122; G11B 33/1493; B60R 11/02; H05F 3/02
See application file for complete search history.

(56) References Cited

U.S. PATENT DOCUMENTS

| | | | | |
|---|---|---|---|---|
| 5,677,811 | A | * | 10/1997 | Kuno .................... G11B 25/043 |
| 5,978,569 | A | * | 11/1999 | Traeger ................. G06F 1/1626 710/64 |
| 6,259,573 | B1 | * | 7/2001 | Tsuwako .................. G11B 5/40 360/323 |
| 6,417,984 | B1 | * | 7/2002 | Tamura .............. G11B 33/1493 |
| 11,220,182 | B1 | * | 1/2022 | Fisker .................... B60K 35/00 |
| 2007/0068366 | A1 | * | 3/2007 | Hamaoka ............ B60R 11/0211 84/423 R |

FOREIGN PATENT DOCUMENTS

JP    8-203261 A    8/1996
JP    2008-10796 A    1/2008

* cited by examiner

*Primary Examiner* — Andrew Sasinowski
(74) *Attorney, Agent, or Firm* — Birch, Stewart, Kolasch & Birch, LLP

(57) ABSTRACT

A conductive unit (10) electrically connected to a bracket (2) has a smaller electrical resistivity than the bracket (2) and a navigation chassis (3), and guides a noise current, generated in a disc reproducing unit (1) and conducted to the bracket (2), to a coupling unit (7) via a rear chassis (5).

5 Claims, 4 Drawing Sheets

IN-VEHICLE INFORMATION APPARATUS

TECHNICAL FIELD

The present invention relates to an in-vehicle information apparatus.

BACKGROUND ART

Information apparatuses of the related art are grounded using a chassis of the apparatus. For example in a method of attaching a magnetic disk drive described in Patent Literature 1, among a total of eight attachment portions on a base of the magnetic disk drive, six attachment portions closer to a magnetic head are attached while insulated from an information apparatus chassis, and the two attachment portions located farthest from the magnetic head are attached while electrically connected with the information apparatus chassis. An electromagnetic wave generated in the magnetic disk drive is grounded through the information apparatus chassis by the two attachment portions.

CITATION LIST

Patent Literature

Patent Literature 1: JP H8-203261 A

SUMMARY OF INVENTION

Technical Problem

In the method of attaching the magnetic disk drive described in the above Patent Literature 1, no particular consideration is made on a current which has flowed to the information apparatus chassis due to the grounding. Therefore, there is a possibility that a current that is noise for the information apparatus (hereinafter referred to as "noise current") flows to an information apparatus chassis in the vicinity of an audio board inside the information apparatus and thereby affects the audio board and that, as a result, the audio processing performance of the information apparatus is also affected.

The present invention has been devised in order to solve the above problems, and it is an object of the present invention to provide an in-vehicle information apparatus capable of suppressing the influence of a noise current, generated in a disc reproducing unit, on an audio board.

Solution to Problem

An in-vehicle information apparatus according to the present invention includes: a disc reproducing unit to read out information recorded on a disc; an audio board to generate an audio signal by processing the information read out by the disc reproducing unit; a coupling unit to which a ground terminal extending from a vehicle body side is to be connected; a first chassis to which the audio board is attached; a second chassis electrically connected to the coupling unit and the first chassis, the coupling unit exposed from the second chassis; a bracket which is electrically connected to the disc reproducing unit, the first chassis, and the second chassis, and with which the disc reproducing unit is attached to the first chassis and the second chassis; and a conductive unit electrically connected to the bracket and having a smaller electrical resistivity than the first chassis and the bracket, the conductive unit for guiding a noise current to the coupling unit via the second chassis, the noise current having been conducted from the disc reproducing unit to the bracket.

Advantageous Effects of Invention

According to the present invention, the conductive unit electrically connected to the bracket has a smaller electrical resistivity than the first chassis and the bracket, and thus allows the noise current having been generated in the disc reproducing unit to flow to the second chassis and not to the first chassis. Thus, it is possible to prevent the noise current from affecting the audio board.

DESCRIPTION OF EMBODIMENTS

To describe the present invention further in detail, an embodiment for carrying out the present invention will be described below with reference to the accompanying drawings.

First Embodiment

Figure 1:
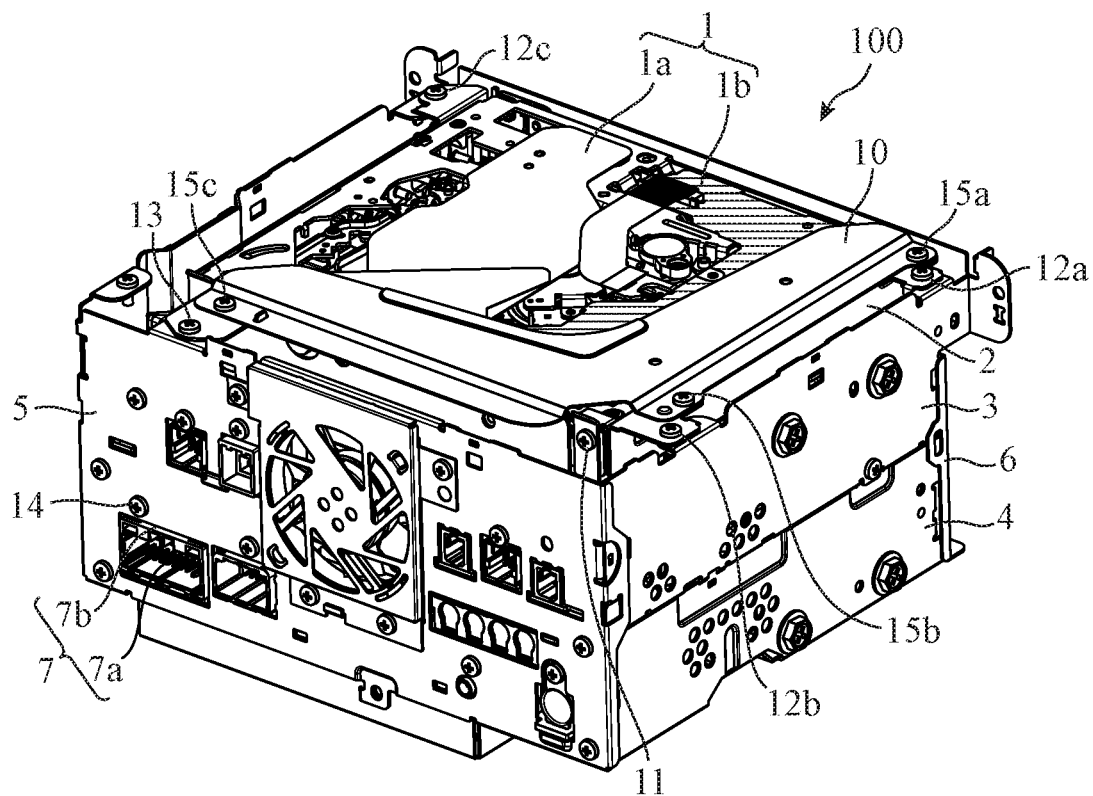
FIG. 1 is an overall perspective view of an in-vehicle information apparatus according to a first embodiment.
Figure 2:
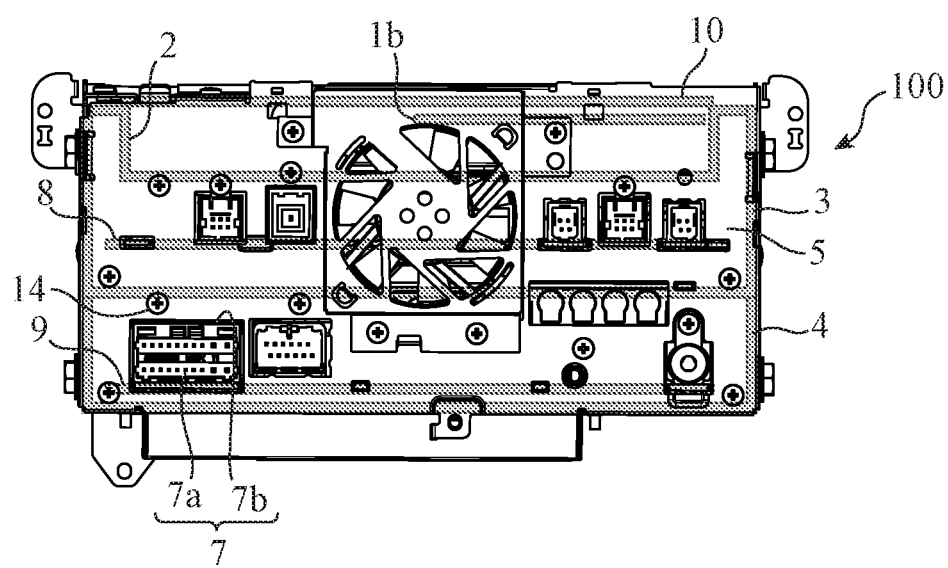
FIG. 2 is a rear view of the in-vehicle information apparatus according to the first embodiment.
Figure 3:
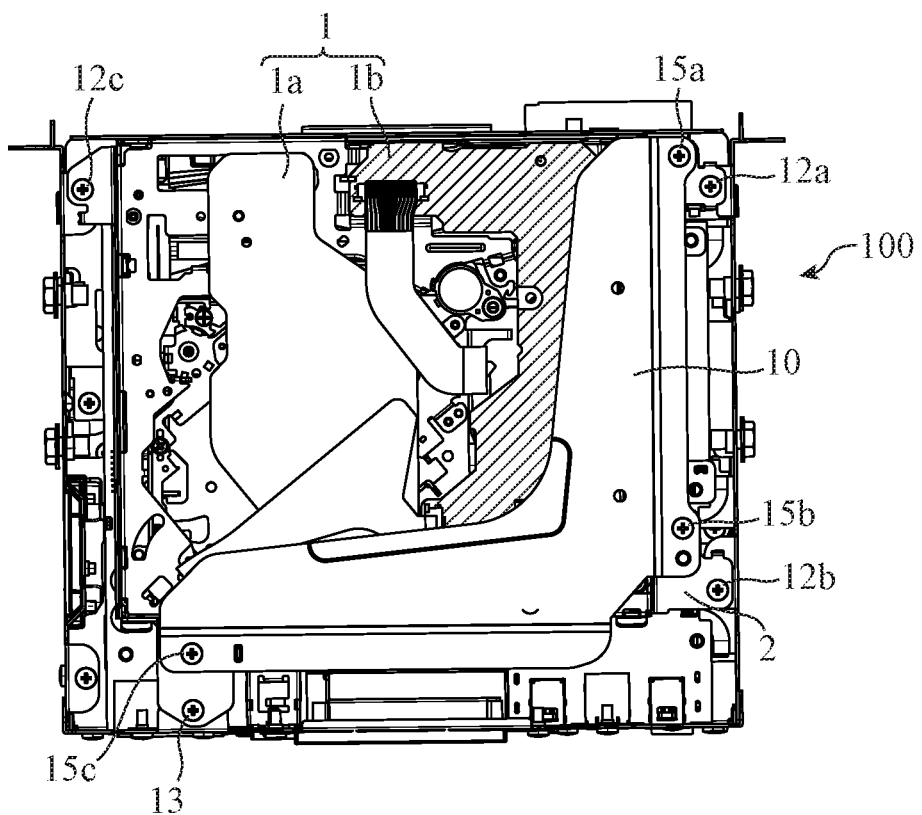
FIG. 3 is a plan view of the in-vehicle information apparatus according to the first embodiment.

FIG. 1 is an overall perspective view of an in-vehicle information apparatus 100 according to a first embodiment. FIG. 2 is a rear view of the in-vehicle information apparatus 100, and FIG. 3 is a plan view of the in-vehicle information apparatus 100. In the rear view of FIG. 2, a mechanism board 1b, a bracket 2, a navigation chassis 3, an audio chassis 4, a navigation board 8, an audio board 9, and a conductive unit 10, which will be described later, are superimposed in a cross-sectional state.

The in-vehicle information apparatus 100 provides a user with a navigation function and an audio function and is used by being attached to a vehicle body such as the inside of a dashboard. The in-vehicle information apparatus 100 includes a disc reproducing unit 1, the bracket 2, the navigation chassis 3, the audio chassis 4, a rear chassis 5, a front chassis 6, a coupling unit 7, the navigation board 8, the audio board 9, the conductive unit 10, and other components.

The disc reproducing unit 1 reads information recorded on a disc, and includes a reproducing mechanism 1a and the mechanism board 1b. Note that, the mechanism board 1b is hatched in FIGS. 1 and 3 to facilitate understanding. The reproducing mechanism 1a has a clamper, a spindle motor, and the like. The mechanism board 1b controls the operation of the reproducing mechanism 1a. In the first embodiment, the mechanism board 1b is provided on the right side on the paper surface in FIG. 3.

Figure 4:
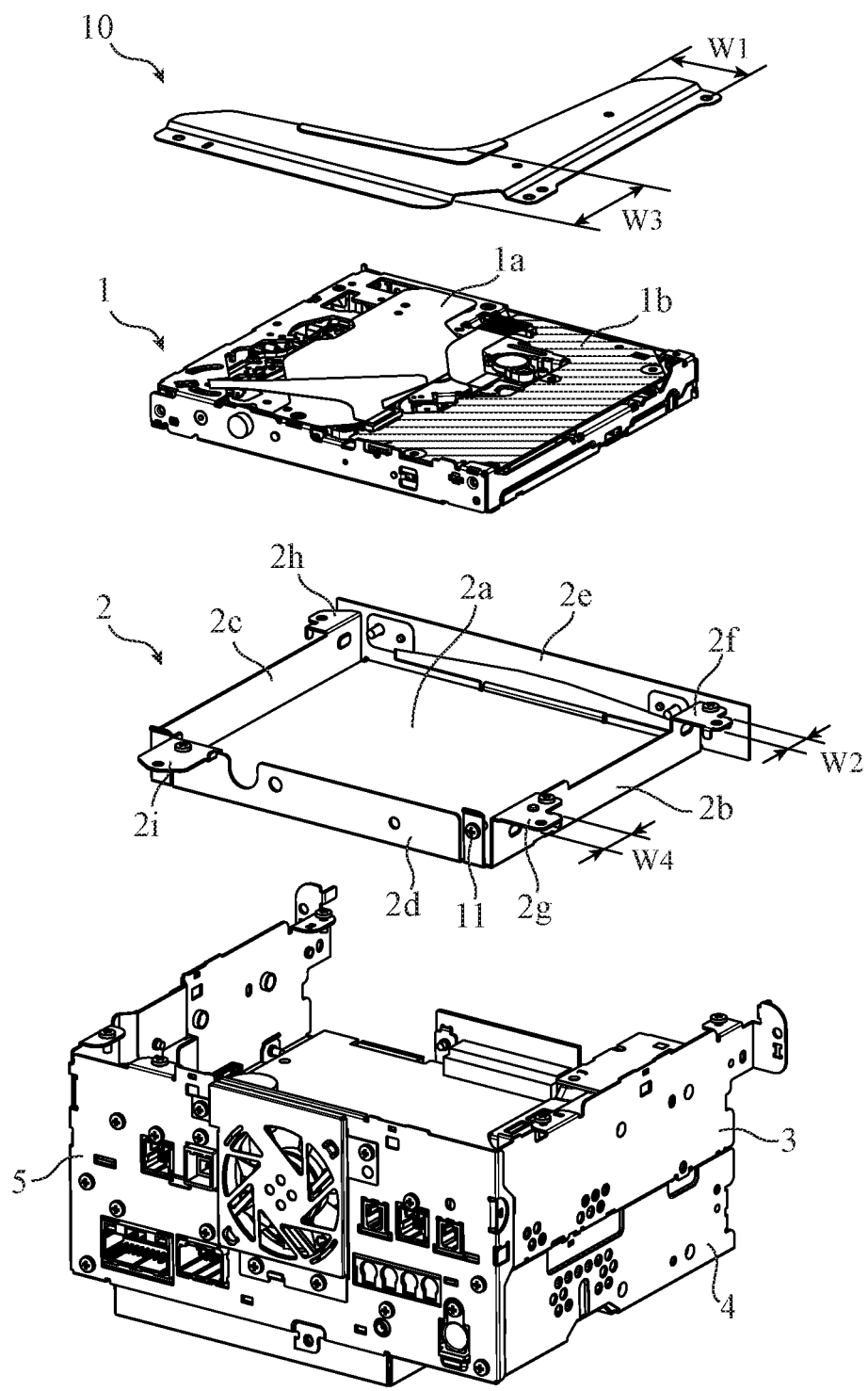
FIG. 4 is an exploded perspective view of the in-vehicle information apparatus according to the first embodiment.

The bracket 2 is for attaching the disc reproducing unit 1 to the navigation chassis 3, the rear chassis 5, and the front chassis 6. FIG. 4 is an exploded perspective view of the in-vehicle information apparatus 100. The bracket 2 has a substantially box shape with an open top surface in FIG. 4, and is obtained by machining, for example, a metal plate made of steel. The bracket 2 has a substantially rectangular bottom surface 2a, arms 2b to 2e rising from respective sides of the bottom surface 2a, and attachment pieces 2f to 2i protruding laterally from the arms 2b to 2d. The arm 2b is on the navigation chassis 3 side and the mechanism board 1b side, and the arm 2c faces the arm 2b. Meanwhile, the arm 2d is on the rear chassis 5 side, and the arm 2e faces the arm 2d. In the bracket 2, members to be attached such as the navigation chassis 3, the rear chassis 5, and the conductive unit 10 are attached at the attachment pieces 2f to 2i supported by the arms 2b to 2d.

The disc reproducing unit 1 is attached to the bracket 2 in a conductive state by screwing. For the screwing, for example, a screw 11 illustrated in FIGS. 1 and 4 is used. The bracket 2 is attached to the navigation chassis 3 in a conductive state by screwing using a screw 12a, a screw 12b, and a screw 12c. The screw 12a penetrates a hole formed in the attachment piece 2f, the screw 12b penetrates a hole formed in the attachment piece 2g, and the screw 12c penetrates a hole formed in the attachment piece 2h. The bracket 2 is attached to the rear chassis 5 in a conductive state by screwing using a screw 13. The screw 13 penetrates a hole formed in the attachment piece 2i.

The navigation board 8 is attached to the navigation chassis 3 by screwing or other means. As illustrated in FIG. 2, the navigation chassis 3 has a shape in which side surfaces rise from two opposing sides of a substantially rectangular bottom surface. The navigation chassis 3 is obtained by machining, for example, a metal plate made of steel.

The audio board 9 is attached to the audio chassis 4 by screwing or other means. As illustrated in FIG. 2, the audio chassis 4 has a shape in which side surfaces rise from two opposing sides of a substantially rectangular bottom surface. The audio chassis 4 is obtained by machining, for example, a metal plate made of steel. The audio chassis 4 is provided so that the navigation chassis 3 is sandwiched between the audio chassis 4 and the bracket 2.

The rear chassis 5 is a plate-like member included on the back of the in-vehicle information apparatus 100. The rear chassis 5 is obtained by machining, for example, a metal plate made of steel. The coupling unit 7 is exposed from the rear chassis 5.

The front chassis 6 is a plate-like member included on the front of the in-vehicle information apparatus 100. The front chassis 6 is obtained by machining, for example, a metal plate made of steel.

The navigation chassis 3, the audio chassis 4, the rear chassis 5, and the front chassis 6 are assembled into a substantially box-like shape with one surface open, and thereby form a housing of the in-vehicle information apparatus 100. The navigation chassis 3 and the audio chassis 4 are electrically connected with each other, and the both are electrically connected with the rear chassis 5 and the front chassis 6. The navigation chassis 3 and the audio chassis 4 are included in a first chassis. Meanwhile, the rear chassis 5 is included in a second chassis.

The coupling unit 7 is connected to a ground terminal (not illustrated) extending from the vehicle body side. The ground terminal is provided in a vehicle harness. The coupling unit 7 has a connector 7a and a connector holder 7b. The connector 7a is soldered to the audio board 9.

The connector holder 7b is a conductive member that functions as a cover that covers the connector 7a. The connector holder 7b is soldered to the audio board 9. The connector 7a and the connector holder 7b are electrically connected via a conductive pattern formed on the audio board 9. The connector holder 7b is attached to the rear chassis 5 in a conductive state by screwing using a screw 14.

The navigation board 8 performs processing related to navigation such as route search and map display.

The audio board 9 processes information read by the disc reproducing unit 1 to generate an audio signal. The audio signal is output to a speaker (not illustrated) to provide audio to a user.

The conductive unit 10 is a substantially L-shaped member in a plan view. The conductive unit 10 is obtained by machining, for example, a metal plate made of aluminum. Other than aluminum, the conductive unit 10 may be made of silver, copper, or other materials. The point is that the conductive unit 10 is only required to have a smaller electrical resistivity than the navigation chassis 3, the audio chassis 4, and the bracket 2. The conductive unit 10 is attached to the bracket 2 in a conductive state by screwing using a screw 15a, a screw 15b, and a screw 15c.

The screw 15a is attached to a screw hole formed in the attachment piece 2f. The screw hole is formed in the attachment piece 2f separately from the hole which the screw 12a penetrates, and has the inner circumferential surface of a female screw shape. The screw 15b is attached to a screw hole formed in the attachment piece 2g. The screw hole is formed in the attachment piece 2g separately from the hole which the screw 12b penetrates, and has the inner circumferential surface of a female screw shape. The screw 15c is attached to a screw hole formed in the attachment piece 2i. The screw hole is formed in the attachment piece 2i separately from the hole which the screw 13 penetrates, and has the inner circumferential surface of a female screw shape. In this manner, the conductive unit 10 is attached to the bracket 2 at the positions on the side of the navigation chassis 3 by the screws 15a and 15b, and is attached to the bracket 2 at the position on the side of the rear chassis 5 by the screw 15c.

Figure 5:
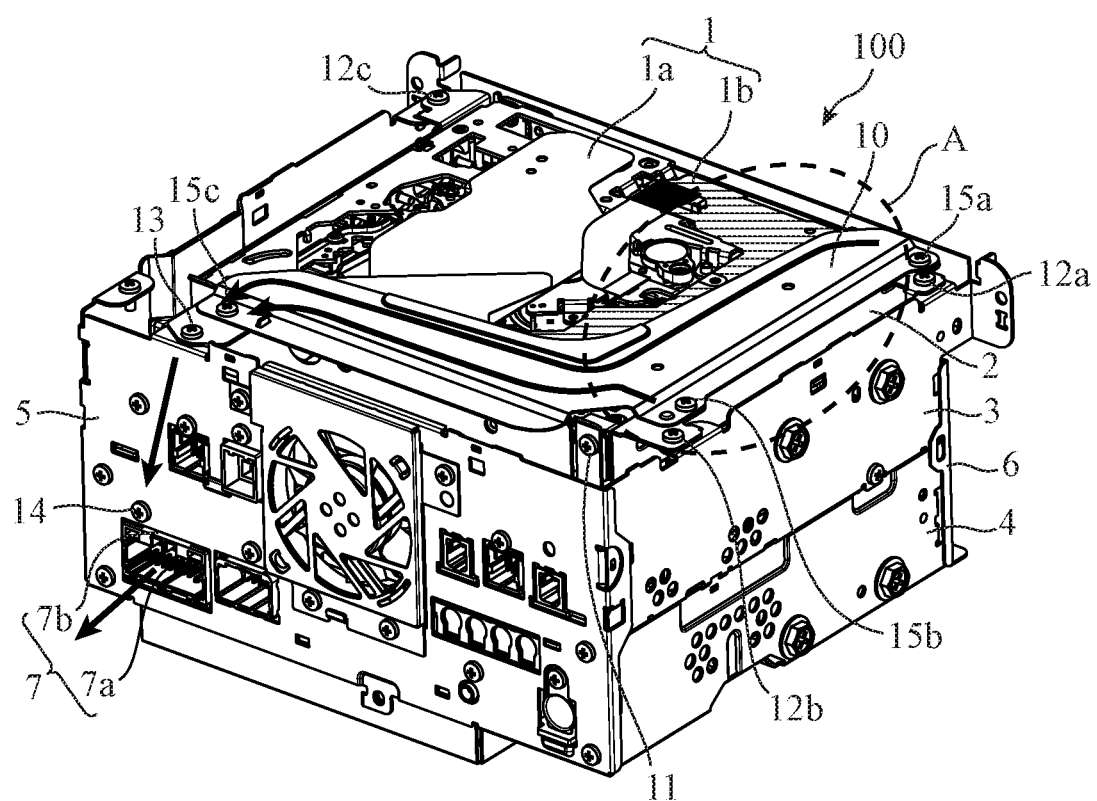
FIG. 5 is an overall perspective view of the in-vehicle information apparatus according to the first embodiment illustrating flows of noise currents.

In the in-vehicle information apparatus 100 configured as described above, for example, when a disc is reproduced, a noise current is generated in the mechanism board 1b of the disc reproducing unit 1. In a case where this noise current flows into a main part of the audio board 9 such as a chip mounted on the audio board 9, it causes deterioration of quality of the sound emitted from the speaker (not illustrated). With the above arrangement, the noise current generated in the disc reproducing unit 1 is grounded without flowing into the main part in the in-vehicle information apparatus 100. How the noise current generated in the disc reproducing unit 1 is grounded will be specifically described below. FIG. 5 is an overall perspective view of the in-vehicle information apparatus 100 in which a flow of a noise current is indicated by an arrow.

A noise current is generated in an area A which is illustrated in FIG. 5 and where the mechanism board 1b of the disc reproducing unit 1 is located. Since the disc reproducing unit 1 is attached to the bracket 2 in a conductive state, the noise current generated in the disc reproducing unit 1 first flows to the bracket 2. More specifically, the noise current mainly flows to the arm 2b, which is close to the mechanism board 1b, of the bracket 2.

In the attachment pieces 2f and 2g continuous with the arm 2b, the bracket 2 is electrically connected to the navigation chassis 3 by the screws 12a and 12b, and the bracket 2 is electrically connected to the conductive unit 10 by the screws 15a and 15b. The conductive unit 10 has a smaller electrical resistivity than the navigation chassis 3 and the bracket 2. Therefore, the noise current having flowed into the arm 2b does not flow to the navigation chassis 3, nor does it flow along the bottom surface 2a of the bracket 2 to the other arms 2c to 2e or other components but flows to the conductive unit 10 from the attachment pieces 2f and 2g.

In addition, as illustrated in FIG. 3, the conductive unit 10 is attached to the bracket 2 by the screws 15a and 15b at positions closer to the disc reproducing unit 1 than the positions of the screws 12a and 12b at which the bracket 2 is attached to the navigation chassis 3. As a result, the noise current having flowed from the disc reproducing unit 1 to the bracket 2 more reliably flows to the conductive unit 10 without flowing to the navigation chassis 3.

Furthermore, a cross-sectional area S1 of the conductive path in the conductive unit 10 of the noise current conducted from each of the attachment pieces 2f and 2g to the conductive unit 10 is greater than or equal to a cross-sectional area S2 of the conductive path of the noise current in the corresponding one of attachment pieces 2f and 2g. This further ensures that the noise current having flowed from the disc reproducing unit 1 to the bracket 2 flows to the conductive unit 10 without flowing to the navigation chassis 3. The cross-sectional area S1 related to the attachment piece 2f is obtained by multiplying a width W1 of the conductive unit 10 in FIG. 4 by the thickness of the plate member forming the conductive unit 10. Likewise, the cross-sectional area S2 related to the attachment piece 2f is obtained by multiplying a width W2 of the attachment piece 2f in FIG. 4 by the thickness of the plate member forming the bracket 2. The cross-sectional area S1 related to the attachment piece 2g is obtained by multiplying a width W3 of the conductive unit 10 in FIG. 4 by the thickness of the plate member forming the conductive unit 10. Likewise, the cross-sectional area S2 related to the attachment piece 2g is obtained by multiplying a width W4 of the attachment piece 2g in FIG. 4 by the thickness of the plate member forming in the bracket 2. Note that in a case where there is no significant difference in the thickness between the bracket 2 and the conductive unit 10, more simple design in which the width W1 is greater than or equal to the width W2, and the width W3 is greater than or equal to the width W4 is allowed.

The noise current having flowed to the conductive unit 10 as described above flows through the inside of the conductive unit 10, and then flows to the attachment piece 2i on the rear chassis 5 side where the screw 15c, which is another position where the conductive unit 10 is attached to the bracket 2, is positioned.

The bracket 2 is electrically connected to the rear chassis 5 at the attachment piece 2i by the screw 13, and thus the noise current having flowed to the attachment piece 2i flows to the rear chassis 5. The connector holder 7b is attached to the rear chassis 5 in a conductive state. The noise current having flowed to the rear chassis 5 flows to the connector holder 7b. The connector holder 7b is electrically connected to the connector 7a by a conductive pattern on the audio board 9, and thus the noise current flows from the connector holder 7b to the connector 7a via the conductive pattern. Note that the noise current immediately flows from the connector holder 7b to the connector 7a via the conductive pattern since the connector 7a and the connector holder 7b are soldered close to each other on the audio board 9. The noise current does not spread to the main part of the audio board 9 in the process of flowing from the connector holder 7b to the connector 7a.

A ground terminal (not illustrated) extending from the vehicle body side is inserted and connected to the connector 7a. The noise current having flowed to the connector 7a flows to the ground terminal and is thereby grounded.

As described above, with provision of the conductive unit 10, the noise current having been conducted from the disc reproducing unit 1 to the bracket 2 is guided to the coupling unit 7 via the rear chassis 5 without flowing to the navigation chassis 3. The navigation chassis 3 is electrically connected to the audio chassis 4, and the audio board 9 is attached to the audio chassis 4. Thus, if a noise current flows from each of the attachment pieces 2f and 2g of the bracket 2 to the navigation chassis 3, there is a possibility that the noise current then flows to the main part of the audio board 9 via the audio chassis 4. In the in-vehicle information apparatus 100, providing the conductive unit 10 prevents a noise current from flowing from the bracket 2 to the navigation chassis 3.

Note that the case where conduction among the members is ensured by screwing has been described as an example in the above. However, the conduction among the members may be ensured by fitting metal plates forming the respective members. Fitting of metal plates is performed, for example, by fitting a dowel provided to a metal plate into a hole formed in another metal plate.

Meanwhile, the coupling unit 7 includes the connector 7a and the connector holder 7b in the above description. However, in the coupling unit 7, a connector may be integrated with the function as a connector holder by a configuration in which, for example, a housing of the connector itself is formed of a metal plate and the metal plate is screwed to the audio board 9. In this case, a noise current having flowed from the rear chassis 5 to the connector flows directly to the ground terminal (not illustrated) without flowing through the pattern on the audio board 9. Note that the coupling unit 7 is only required to be attached in a conductive state to the rear chassis 5 which is the second chassis to which the noise current is guided by the conductive unit 10, and thus it is not necessary for the coupling unit 7 to be attached to the audio board 9.

As described above, according to the in-vehicle information apparatus 100 of the first embodiment, the conductive unit 10 electrically connected to the bracket 2 has a smaller electrical resistivity than the bracket 2 and the navigation chassis 3, and guides the noise current, having been generated in the disc reproducing unit 1 and conducted to the bracket 2, to the coupling unit 7 via the rear chassis 5. By allowing the noise current to flow to the rear chassis 5 and not to the audio chassis 4 to which the audio board 9 is attached, it is possible to prevent the noise current from affecting the audio board 9.

Moreover, the conductive unit 10 is attached to the bracket 2 at a position on the side of the rear chassis 5, and is also attached to the bracket 2 at a position closer to the disc reproducing unit 1 than a position where the bracket 2 is attached to the navigation chassis 3. With this arrangement, it is possible to further ensure that the noise current having flowed from the disc reproducing unit 1 to the bracket 2 flows to the conductive unit 10.

Furthermore, the members are electrically connected by screwing in the in-vehicle information apparatus 100. With this arrangement, it is possible to ensure reliable conduction than merely bringing the members into contact with each other.

Alternatively, the members are electrically connected by fitting metal plates in the in-vehicle information apparatus 100. With this arrangement, it is possible to ensure reliable conduction than merely bringing the members into contact with each other.

The bracket 2 has the attachment pieces 2f and 2g to which the conductive unit 10 and the navigation chassis 3 are attached, and the cross-sectional area S1 of the conductive path of the noise current in the conductive unit 10 conducted from each of the attachment pieces 2f and 2g to the conductive unit 10 is larger than or equal to the cross-sectional area S2 of the conductive path of the noise current in the corresponding one of the attachment pieces 2f and 2g. With this arrangement, it is possible to further ensure that the noise current having flowed from the disc reproducing unit 1 to the bracket 2 flows to the conductive unit 10. Meanwhile, as long as the cross-sectional area S1 is larger than or equal to the cross-sectional area S2, it is not necessary for the conductive unit 10 to cover the entire disc reproducing unit 1 as a top surface cover of the in-vehicle information apparatus 100, and thus the conductive unit 10 may be substantially L-shaped in a plan view as described above. Therefore, it is possible to suppress an increase in weight or the like of the in-vehicle information apparatus 100 caused by provision of the conductive unit 10.

Note that the present invention may include modification of any component of the embodiment, or omission of any component of the embodiment within the scope of the present invention.

INDUSTRIAL APPLICABILITY

As described above, an in-vehicle information apparatus according to the present invention can prevent a noise current from affecting an audio board, and thus is particularly suitable for being mounted for use in a vehicle in which provision of high-quality sound is desired.

REFERENCE SIGNS LIST

1: Disc reproducing unit, 1a: Reproducing mechanism, 1b: Mechanism board, 2: Bracket, 2a: Bottom surface, 2b to 2e: Arm, 2f to 2i: Attachment piece, 3: Navigation chassis, 4: Audio chassis, 5: Rear chassis, 6: Front chassis, 7: Coupling unit, 7a: Connector, 7b: Connector holder, 8: Navigation board, 9: Audio board, 10: Conductive unit, 11, 12a to 12c, 13, 14, 15a to 15c: Screw, 100: In-vehicle information apparatus.

The invention claimed is:

1. An in-vehicle information apparatus comprising:
    a disc reproducing unit to read out information recorded on a disc;
    an audio board to generate an audio signal by processing the information read out by the disc reproducing unit;
    a coupling unit to which a ground terminal extending from a vehicle body side is to be connected;
    a first chassis to which the audio board is attached;
    a second chassis electrically connected to the coupling unit and the first chassis, the coupling unit exposed from the second chassis;
    a bracket which is electrically connected to the disc reproducing unit, the first chassis, and the second chassis, and with which the disc reproducing unit is attached to the first chassis and the second chassis; and
    a conductive unit electrically connected to the bracket and having a smaller electrical resistivity than the first chassis and the bracket, the conductive unit for guiding a noise current to the coupling unit via the second chassis, the noise current having been conducted from the disc reproducing unit to the bracket.

2. The in-vehicle information apparatus according to claim 1, wherein the conductive unit is attached to the bracket at a position on a side of the second chassis, and is attached to the bracket at a position closer to the disc reproducing unit than a position where the bracket is attached to the first chassis.

3. The in-vehicle information apparatus according to claim 1, wherein members are electrically connected by screwing.

4. The in-vehicle information apparatus according to claim 1, wherein members are electrically connected by fitting of metal plates.

5. The in-vehicle information apparatus according to claim 1,
    wherein the bracket includes an attachment piece to which the conductive unit and the first chassis are attached, and
    a cross-sectional area of a conductive path of the noise current in the conductive unit conducted from the attachment piece to the conductive unit is larger than or equal to a cross-sectional area of a conductive path of the noise current in the attachment piece.

* * * * *